Aug. 2, 1932.  P. F. E. PIETTE  1,870,140

APPARATUS FOR DETECTING AND MEASURING VIBRATIONS

Filed July 12, 1929   3 Sheets-Sheet 1

Inventor:
P. F. E. Piette,
Conway Cox
Att'y.

Patented Aug. 2, 1932

1,870,140

UNITED STATES PATENT OFFICE

PIERRE FELIX EDOUARD PIETTE, OF CLAMART, FRANCE

APPARATUS FOR DETECTING AND MEASURING VIBRATIONS

Application filed July 12, 1929, Serial No. 377,901, and in Belgium December 8, 1928.

The present invention relates to methods and apparatus for detecting and measuring vibration.

One of the objects of the invention is to provide a method and apparatus wherein mechanical vibrations may be transmitted to a fluid system arranged to indicate the vibratory effect in terms of liquid level or equivalents of the latter.

Other objects will appear in the course of the detailed description now to be given with reference to the accompanying drawings, in which:—

The principle upon which the present invention is based is a simple one. The vibrations of a body are transmitted to a tube fitted with a venturi and containing a liquid. A manometer is connected to the narrow portion of the venturi and indicates the vibratory effect in terms of a change in liquid level.

Figure 1:
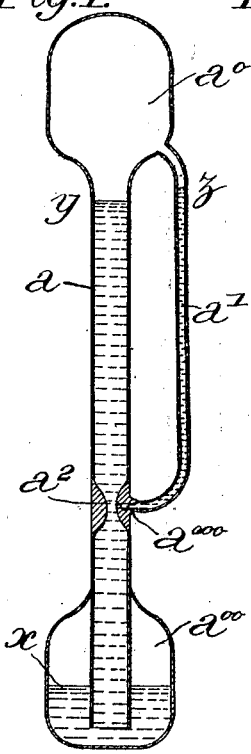
Figs. 1, 2 and 3 are sections through three possible embodiments of the invention designed to indicate vertical vibrations.
Figure 2:
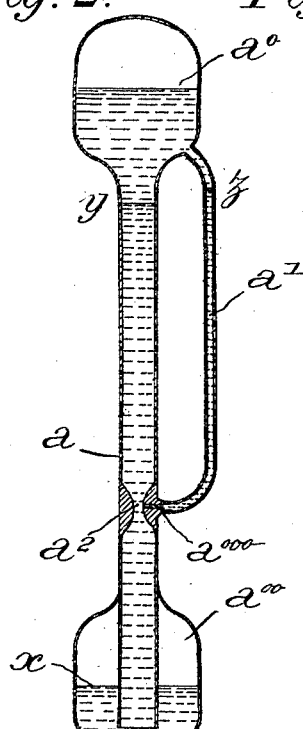
Figure 3:
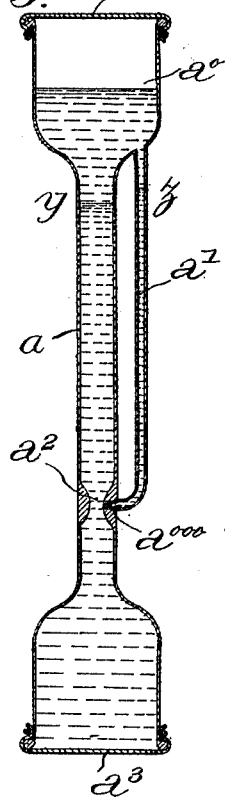

Figs. 1 to 3 show various devices for indicating the vertical component of a vibration. In the form of apparatus illustrated in Fig. 1, $a$ is a metal or a thick glass tube, of any desired diameter, having a venturi $a^2$ formed therein and of the type used for measuring the flow of fluids, $a°$ is a chamber containing air which may be either closed as shown or left open to the atmosphere, $a°°$, a reservoir whose upper portion contains air or a similar gas under pressure and which encloses the lower end of tube $a$, $a°°°$, a relatively narrow orifice traversing the wall of venturi $a^2$, and $a^1$, a manometric tube—capillary, preferably—extending from $a°°°$ to chamber $a°$.

The apparatus operates in the following way: assuming the device to be charged with liquid to a level $x$ in chamber $a°°$, $y$ in tube $a$ and $z$—somewhat different from $y$ because of capillary effects—in tube $a^1$, and then placed in contact with a vibrating shaft, block or the like having a vertical component of vibration, liquid will be driven back and forth through venturi $a^2$, thereby causing a lowered pressure in the venturi through the well known phenomenon of decreased pressure upon flow of liquid through a restricted portion of a tube, which lowered pressure or suction will draw liquid down through tube $a^1$ so as to change the relative levels $y$ and $z$, and this change in level will be a function of the amplitude and frequency of the vibrations communicated to the liquid column in tube $a$. The air in the upper portion of chamber $a°°$ acts as an elastic cushion for supporting the liquid in tube $a$.

The structure shown in Fig. 2 is identical with that illustrated in Fig. 1, but here, in order to multiply the relative change of level between $y$ and $z$, a second liquid, of different density than that contained in chamber $a°°$ and in tubes $a$ and $a^1$, is poured into chamber $a°$ so that said tubes communicate via orifice $a°°°$ by means of a liquid of a given density, and via chamber $a°$ by means of a liquid of different density, said liquids being, of course, immiscible with one another. With an apparatus of this type, it may be shown that the change of level $h^2$ in the tube $a^1$ is equal to $$h^1 \frac{d^1}{d^1 - d^2},$$

where $h^1$ is the change of level in tube $a^1$ observed in the form of device represented in Fig. 1, $d^1$ the density of the heavier of the two liquids and $d^2$ the density of the lighter. A cursory glance at this equation shows immediately that, by choosing liquids of appropriate density, a very considerable factor of multiplication may be obtained in liquid level indications.

The derivation of the above formula will be clear from the following:

Assuming the suction in the throat of the venturi caused by a given vibration to be $s$. This suction draws the liquid in tube $a^1$, Fig.

1, down through a distance $h^1$. It is therefore evident that this suction removes from the tube an amount of liquid the weight of which will be $h^1d^1A$ (A being the cross section of tube $a^1$). Therefore (1)  $s = h^1d^1A$ In Fig. 2, the weight of the lower (heavier) liquid removed from the tubes is obviously $h^2d^1A$. Because of the enlarged portion $a^\circ$, the head of the upper (light) liquid is changed only by a negligible amount. The recession of the lower liquid will draw into the tube an additional column $h^2$ of the upper liquid, of weight $h^2d^2A$. Now obviously this upper liquid is added and therefore acts to depress still further the level of the lower liquid. The weight of the added upper liquid therefore acts with the suction; or:

(2)  $s + h^2d^2A = h^2d^1A$; or
(3)  $s = h^2d^1A - h^2d^2A$

Equating (1) and (3) and removing A, we obtain $$h^1d^1 = h^2d^1 - h^2d^2 \text{ or } h^2 = h^1\frac{d^1}{d^1 - d^2}.$$

The form of apparatus shown in Fig. 3 differs from those already described only in providing chamber $a^{\circ\circ}$ with an elastic (rubber, thin corrugated or the like) membrane $a^3$ and forming tube $a$ and said chamber in direct communication with one another. The top of the apparatus may, optionally, be provided with a second elastic membrane $a^4$, similar to $a^3$, to prevent loss of liquid. This apparatus functions substantially in the same way as those shown in Figs. 1 and 2. The vibrating body in contact with membrane $a^3$ sets the column in tube $a$ in motion and the liquid displacements, magnified by venturi $a^2$, are indicated by the change in levels $y$, $z$. It is, of course, obvious that this form of device may operate with the double-liquid multiplying system shown in Fig. 2.

Figure 4:
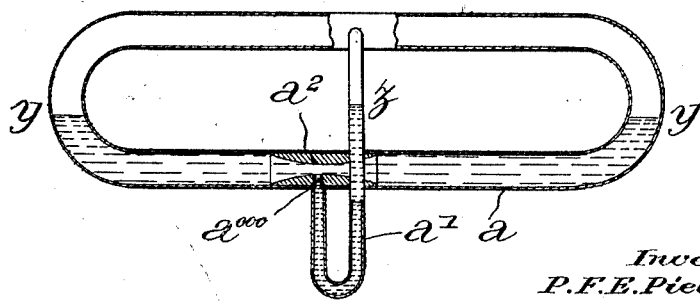
Fig. 4 is a section through a structure adapted to detect and indicate horizontal vibration.

The apparatus represented in Fig. 4 is composed of an elongated continuous tube $a$ fitted with venturi $a^2$ and a manometer $a^1$ similar to those above described extending from an orifice $a^{\circ\circ\circ}$ in the wall of $a^2$ to the opposite arm of tube $a$. Venturi $a^2$ is submerged in a liquid which fills tube $a^1$ to level $z$ and the top of the apparatus contains air or any other gas at any desired pressure. Since the venturi is horizontal, tube $a^1$ will indicate horizontal vibrations in terms of changes in level $z$.

Figure 5:
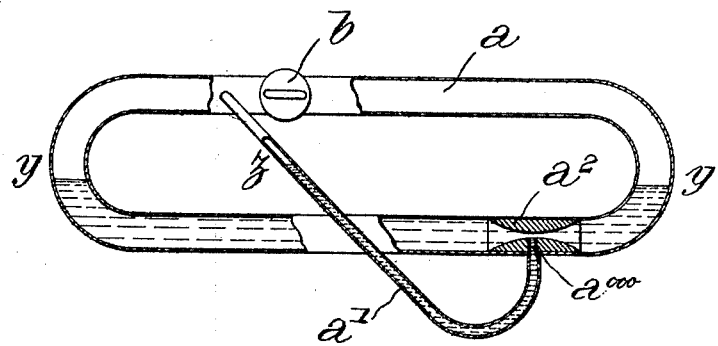
Figs. 5 and 6 are plans, partially in section, of a device adapted to indicate both horizontal and vertical vibration.
Figure 6:
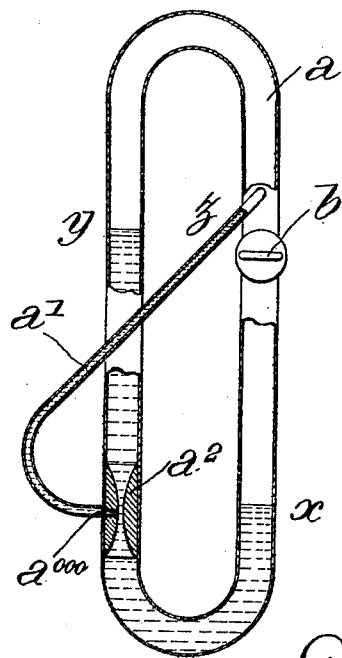

If it be desired to measure the vertical and horizontal components of a vibration this may be done by means of an apparatus of the type shown in Figs. 5 and 6 which differs from the one represented in Fig. 4 only in that tube $a^1$ is inclined at about 45° to the straight portions of tube $a$ and a valve $b$ is positioned adjacent the point where $a^1$ communicates with tube $a$. Cursory inspection of Figs. 5 and 6 shows that with valve $b$ open and the apparatus in horizontal position (Fig. 5), the device corresponds exactly to the one shown in Fig. 4; while when valve $b$ is closed and the apparatus is turned through 90° (Fig. 6), a structure operatively equivalent to the one represented in Fig. 1 is obtained.

Figure 7:
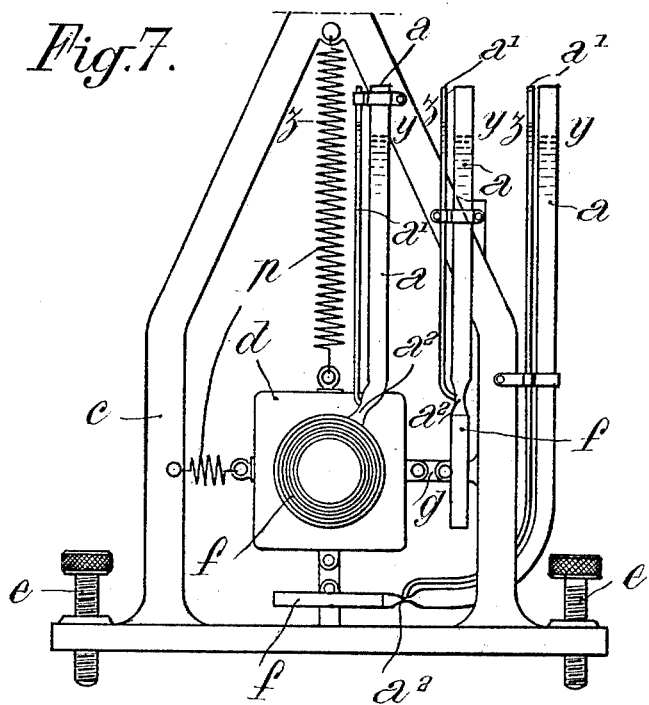
Fig. 7 represents a device for analyzing and registering the vibration of a body in three planes at right angles to one another.

When it is desired to register a vibratory movement in three planes at right angles to one another an apparatus of the kind illustrated in Fig. 7 may be employed. Here a frame $c$, supported on screws $e$, supports a heavy weight $d$ suspended between three springs $p$ and three links $g$ connected to three extensible capsules or chambers $f$ lying in three planes at right angles to one another (the third spring lies behind weight $d$ and is, therefore, not shown). Each chamber $f$ is connected to an assembly composed of a venturi $a^2$, a tube $a$, and a manometer $a^1$, similar to the one shown in Fig. 3, the upper ends of tubes $a$ and $a^1$ being left open to the atmosphere. Assuming the whole apparatus to be mounted on a vibrating body, weight $d$ because of its inertia will not respond to the vibrations transmitted to the frame $c$, and the relative movement between the frame and the weight in each of three planes will be registered by the three indicating instruments. Each instrument may, of course, be provided with a double liquid multiplying system of the type shown in Fig. 2.

Figure 8:
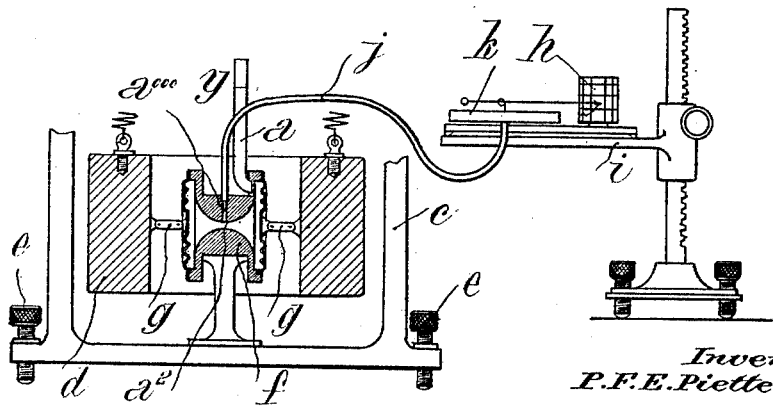
Fig. 8 illustrates a special form of apparatus for indicating horizontal vibration.

Fig. 8 shows a structure designed to register horizontal vibrations and fitted with a manometer of a different type than those represented in the preceding figures. Frame $c$ resiliently supports a weight $d$ fitted with horizontal links $g$ acting on the movable end walls of a chamber $f$ whose lateral walls $a^2$ are given a Venturi form. Tube $a$ communicates with chamber $f$ at any desired point and the movement of liquid through the venturi is registered by a manometer composed of a tube $j$ communicating with the constricted portion of $a^2$ at one extremity and with an extensible capsule $k$ at its other extremity, the changes in volume of $k$ being inscribed on a rotating drum $h$ mounted on an adjustable support $i$. Chamber $f$ and tubes $a$ and $j$ being filled with liquid, drum $h$ will record horizontal vibrations transmitted to weight $d$.

The term "in aspiratory relation" as used in the claims is intended to cover any type of device which makes use of the principle of decreasing pressure in a stream of fluid upon increasing rate of flow, preferably by restricting the path of the fluid as in the usual Venturi tube.

What I claim is:—

1. An apparatus of the class described comprising a container containing a predetermined, fixed volume of liquid, said container having a constricted portion, and manometric means communicating with the constricted portion of said container in aspiratory relation thereto.

2. An apparatus as defined in claim 1 in combination with a vibratable body and means for transmitting vibrations of said body to the liquid contained in said container.

3. An apparatus of the class described comprising a container having a constricted portion formed therein, a manometric tube extending from said constricted portion to another portion of said container, a first liquid filling the constricted portion of said container and a portion of said manometric tube, and a liquid of different density than said first liquid filling the rest of said manometric tube.

4. An apparatus of the class described comprising a container having a constricted portion, a manometric tube communicating with the constricted portion of said container in aspiratory relation thereto, and a liquid filling said container and said manometric tube to predetermined levels when the apparatus is at rest.

5. In combination, a tube including a portion of constricted section, said tube having a passage in the wall thereof forming an angle with and traversing the wall of the constricted portion, a second tube communicating with said passage, and a liquid filling said tubes to predetermined levels.

6. In combination, a closed chamber, a tube extending into said chamber, said tube including a portion of constricted section and having a passage in the wall thereof forming an angle with and traversing the wall of the constricted portion, a second tube communicating with said passage, and a liquid partially filling said closed chamber and filling said tubes to predetermined levels.

7. In combination, a tube including a constricted portion, said tube having a passage formed through its wall at the constricted portion thereof, a second tube communicating with said passage, a deformable membrane sealing one end of said tube, and a liquid filling said tubes to predetermined levels.

8. In combination, a first tube, said tube having a constricted portion and a passage traversing said constricted portion, a second tube extending from said passage to another point in said first tube, and liquid partially filling each of said tubes.

9. A structure as defined in claim 8 in combination with a valve in said first tube.

In testimony whereof I have signed this specification.

PIERRE FELIX EDOUARD PIETTE.